Patented Apr. 20, 1943

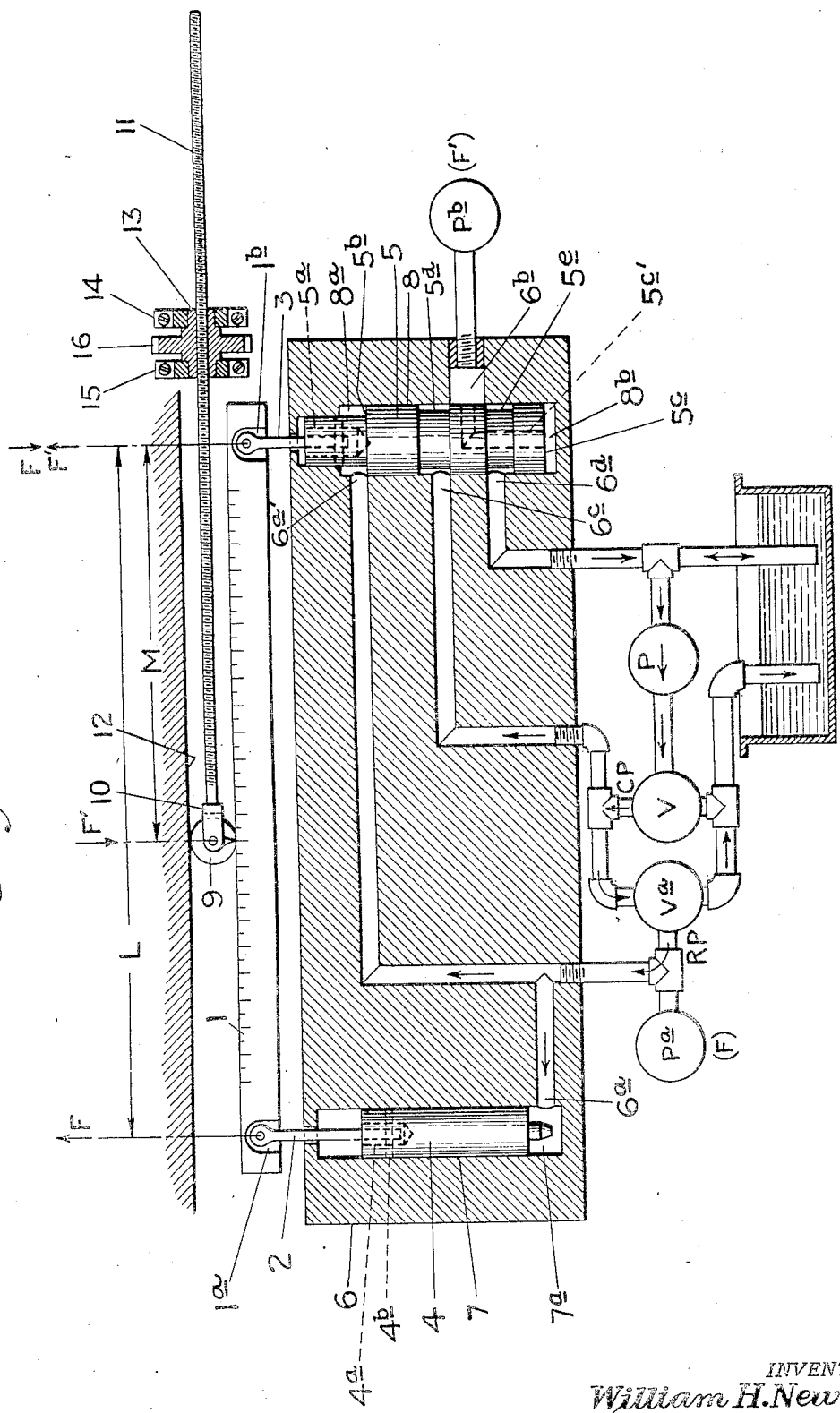

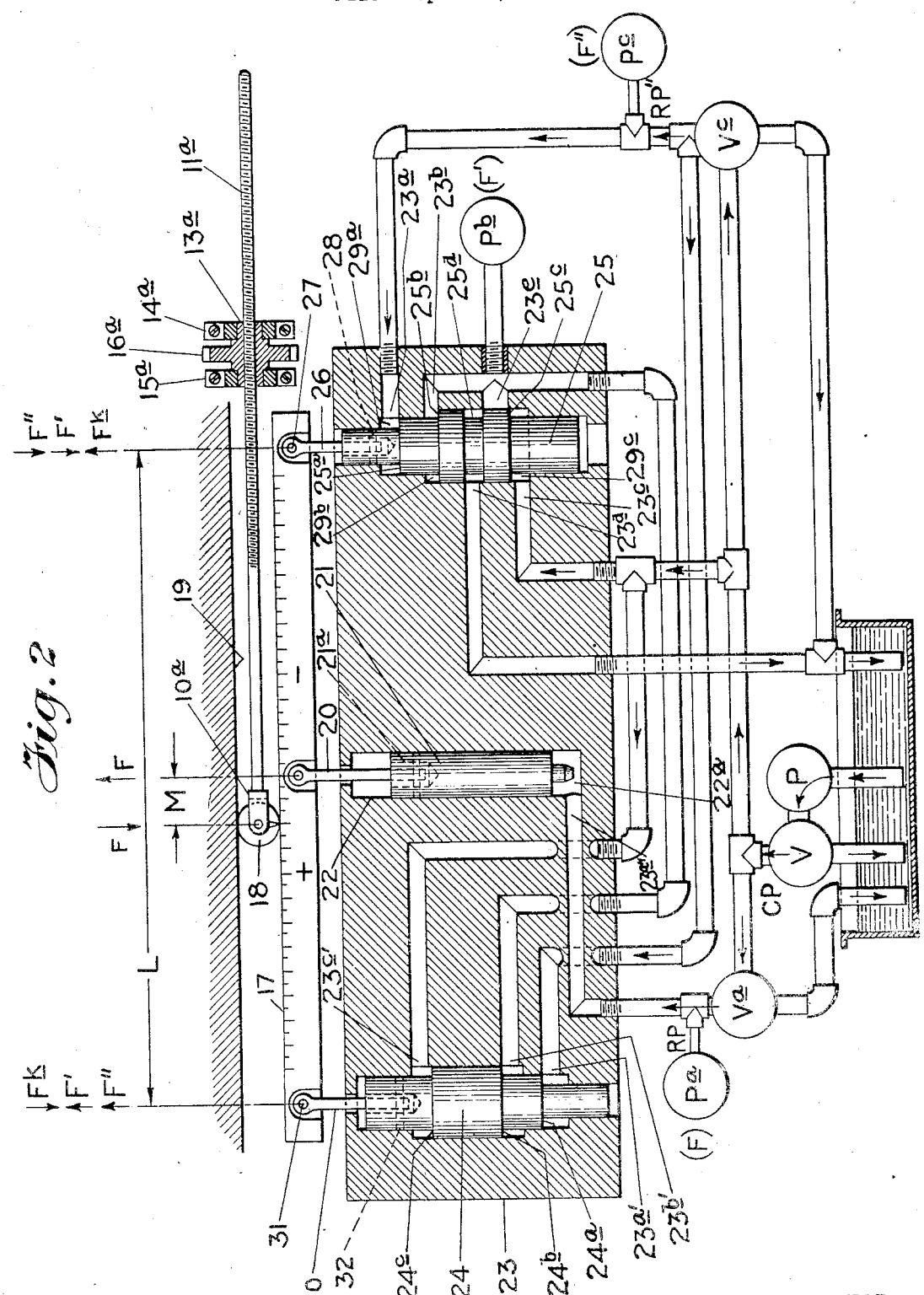

2,317,293

UNITED STATES PATENT OFFICE 2,317,293

COMPUTER MECHANISM

William H. Newell, New York, N. Y., assignor to Ford Instrument Company, Inc., Long Island City, N. Y., a corporation of New York Continuation of application Serial No. 45,052, October 15, 1935. This application September 22, 1939, Serial No. 296,050

8 Claims. (Cl. 235—61)

This application is a continuation of my application Serial No. 45,052.

The invention herein disclosed relates to a hydraulically operated computer capable of performing multiplication and division.

The computer of the invention operates by balancing the moments of forces representing the values of the quantities to be multiplied or divided. The factors to be multiplied or divided are applied as a hydraulic pressure or as the length of a lever through which the force of the hydraulic pressure acts. The moment of the force thus produced is balanced by the moment of another force generated as a hydraulic pressure. This generated force or pressure represents the product or quotient, depending upon whether the impressed force or the generated force acts upon the adjustable or constant length lever. For example, a known force, F, representing one of the quantities of a problem in division, is impressed upon a lever of constant length L. The moment of this force is balanced by a generated force F' acting upon a lever of adjustable length M, which length represents the other factor of the problem. From this relation we have $$F \cdot L = F' \cdot M$$

and, $$F' = \frac{F \cdot L}{M}$$

Likewise in multiplication, a known force F, representing one of the factors in the problem is impressed upon an adjustable lever of length M, M representing the other factor in the problem. The moment $F \cdot M$ is balanced by a generated force F' acting through a lever of constant length L. This relation may be expressed as $$F \cdot M = F' \cdot L$$

and $$F' = \frac{F \cdot M}{L}$$

In both instances L is a constant, therefore, in the first example the force F' represents the quotient F/M, and in the second example the force F' represents the product $F \cdot M$.

Computers for carrying out multiplication and division in this way are illustrated in the accompanying drawings in which:

Fig. 1 is a somewhat diagrammatic illustration of a computer suitable for performing division; and Fig. 2 is a somewhat diagrammatic illustration of a computer suitable for performing multiplication.

In the computers illustrated in the drawings, the forces are applied to a floating beam or lever through hydraulically operated plungers. The beam acts, under the influence of the forces impressed thereon, about a fulcrum or pivot that is displaceable along the length of the beam. The torque, that is, the moment of the applied forces tending to produce rotation, impressed upon the beam is balanced by the moment of a generated force in one case, and by the moment of a generated couple in the other case.

The ends of the beam 1 of the computer for performing division, illustrated in Figure 1, have recesses 1a and 1b in which are pivotally secured the ends of rods 2 and 3 extending from plungers 4 and 5, respectively, that are slidably mounted in a block 6. The beam 1 has graduations thereon as indicated. The plunger 4 is circular in cross section, and is mounted in a circular plunger compartment 7 formed in the block 6. The rod 2 extends through an opening in the block 6 and is received in an axial recess 4a in the plunger 4 and is secured to the plunger by a pin 4b. The chamber of the plunger compartment 7, formed between the end of the plunger 4 adjacent the beam and the corresponding end of the compartment, is open to the atmosphere. The chamber formed at the other end of the plunger and the corresponding end of the plunger compartment 7 constitutes a pressure chamber 7a, and a port 6a communicates with this chamber.

The plunger 5 is mounted in a plunger compartment 8 which is also formed in the block 6. Like the plunger 4, plunger 5 has an axial recess 5a into which the rod 3 extends and the rod 3 is secured to the plunger by a pin. The plunger 5 has a shoulder 5b formed thereon by reducing the diameter of the plunger. This shoulder forms one end of a chamber 8a in the plunger compartment 8. A port 6a' communicates with the chamber 8a. The shoulder 5b which constitutes a pressure surface of the plunger 5 is formed so that pressure in the chamber 8a exerts a downward force on the plunger 5 as seen in Figure 1, that is, the force resulting on the plunger 5 from a hydraulic liquid under pressure in the chamber 8a will be opposite in direction to the force acting on the plunger 4 due to a hydraulic pressure in the chamber 7a. The ports 6a and 6a' are connected by a passage in the block 6 and the areas of the pressure surface 5b of the plunger 5 and the pressure surface of the plunger 4 are equal. Consequently, any pressure in the hydraulic medium filling the connecting passage and the chambers 7a and 8a will impress a couple upon the beam 1.

A roller 9 is rotatably secured in a bracket 10 from which an externally threaded rod 11 extends. The roller 9 is shown between a solid stationary surface 12 and the beam 1 to indicate that the roller which forms a fulcrum for the beam cannot be displaced laterally of the beam. The threaded rod 11 extends through an internally threaded bushing 13 mounted between brackets 14 and 15 and having a spur gear 16 formed integrally therewith. It will be apparent that rotation of the gear 16 will effect movement of the roller 9 longitudinally of the beam and thus change the fulcrum point.

Any couple impressed upon the beam 1 by pressure exerted on the plunger 4 and the pressure surface 5b of the plunger 5 will be balanced by the moment of a force acting upon the lower surface 5c of the plunger 5 and about the fulcrum roller 9. The balancing force acting upon this surface 5c of the plunger 5 is generated as a result of the couple impressed and is indicated in a manner to be explained later. The plunger 5 also constitutes a valve for controlling the volume of the balancing liquid to maintain the beam 1 parallel to the surface 12. For this purpose the plunger 5 is reduced in cross-section at 5d and 5e to form a piston valve. In the position indicated, in which the beam 1 is parallel to the surface 12, the valve section of the plunger 5 laps a port 6b. A port 6c communicates with the annular chamber formed by the reduced section 5d, and another port 6d communicates with the annular chamber formed by the reduced section 5e. A right angular passage 5c' formed in the valve section of the plunger places the port 6b in communication with a chamber 8b formed between the lower surface 5c of the plunger 5 and the end of the compartment 8. The port 6c constitutes a pressure port to which a hydraulic medium such as oil is constantly supplied from a pump P and a constant pressure valve V. The port 6d is an exhaust port. Since the port 6b is in constant communication with the chamber 8b, the pressure in this port is the same as the pressure in the chamber 8b, and it is, consequently, a measure of the force exerted on the end of the plunger and may be indicated by the gauge Pb. The pressure from the pump P is also used to supply the pressure for the chambers 7a and 8a at a desired pressure RP by means of the regulating valve Va, which pressure is indicated by the pressure gauge Pa.

From the above description of the construction of the computer illustrated in Figure 1, it will be apparent that if oil under pressure RP as indicated by the gauge Pa is supplied to the chambers 7a and 8a which are connected together, as heretofore stated, there will be a couple impressed upon the beam acting about the fulcrum roller 9. This couple will cause the plunger 5 to exert a downward pressure on the fluid in the chamber 8b until a pressure is generated therein sufficient to balance the couple impressed upon the beam 1 by virtue of the oil under pressure in the chambers 7a and 8a. While this couple is being balanced, the plunger 5 is maintained in the position illustrated in Figure 1, that is, with the beam 1 parallel to the surface 12. If for any reason, such as leakage, the plunger 5 moves up from the position shown so that the port 6b is connected to the exhaust port 6d, oil will flow from the chamber 8b until a balanced condition exists, that is, the beam 1 is again parallel with the surface 12. If the plunger moves down, oil under pressure will be admitted through the port 6c to the port 6b and through the passage 5c' to the chamber 8b until the plunger 5 rises to its normal position with the beam 1 parallel to the surface 12.

As a consequence of thus balancing the couple by the moment of the force exerted on the surface 5c of the plunger 5 by the pressure generated in the chamber 8b, we have the relation that the couple, which may be represented by $F \cdot L$, F representing the force of the couple and L the lever arm through which the force acts, is balanced by a torque which may be represented by $F' \cdot M$ in which $F'$ represents the force acting on the pressure surface 5c of the plunger 5 and M represents the length of the lever arm through which this force acts, that is, the distance between the point of application of the force as represented by the end of the rod 3 and the fulcrum roller 9. This relation may be expressed as the following equation:

$$F \cdot L = F' M$$

and, therefore, $$F' = \frac{F \cdot L}{M}$$

in which L is a constant. The pressure in the port 6b, therefore, represents the quotient $F/M$, which is indicated by the gauge Pb.

When the computer is used for general application, the force applied through the hydraulic medium in the chambers 7a and 8a, that is, the force represented by F, will correspond to one of the factors of the problem and the position of the fulcrum, determining the length M of the lever, will be made to correspond to the other factor in the problem. The force of the couple may be controlled by the regulating valve Va and be indicated by the pressure gauge Pa. The result of the division may be represented on the pressure gauge Pb connected to the port 6b.

The dividing apparatus just described may also be used to obtain a pressure proportional to the reciprocal of some factor. For example, oil under a constant pressure may be admitted to the chambers 7a and 8a through the valve Va, and the roller 9 moved along the beam in accordance with some factor. The result will then be a pressure in the port 6b which is proportional to the reciprocal of the factor represented by the position of the roller 9, that is, F and L are both constant, therefore $$F' = \frac{1}{M}$$

This pressure representing the reciprocal of a factor may be applied to a computer such as that shown in Figure 2, in a manner and for a purpose hereinafter explained, in which it becomes a factor in a problem of multiplication but actually represents a division of this factor into another.

In the computer illustrated in Figure 2 there is provided a floating beam 17 and a movable fulcrum-roller 18 between a stationary surface 19 and the beam 17, the roller forming a fulcrum for the beam. The position of the fulcrum-roller 18 is controlled in the same manner as fulcrum-roller 9. For this purpose the bracket 10a corresponds to the bracket 10, the threaded rod 11a to rod 11, the threaded bushing 13a to the bushing 13, the brackets 14a and 15a to the brackets 14 and 15, and the spur gear 16a to the spur gear 16. At the center of the beam, one end of a rod 20 is pivotally secured to the beam. The rod extends into and is secured in an axial recess 21a in a plunger 21 that is slidably mounted in a plunger compartment 22 formed in a block 23. The plunger 21 is similar in all respects to the plunger 4 and there is formed by the lower end of the plunger and the adjacent end of the compartment 22 a pressure chamber 22a with which a port 23a'' communicates.

The moment of a force F impressed upon the beam 17 through the plunger 21 and acting through an arm of length M is balanced by a couple generated by plungers 24 and 25 and acting through an arm of fixed length L. The plunger 25 is secured to one end of the beam 17 by a rod 26. One end of the rod 26 is pivotally secured to the beam by a pivot 27 and the other end of the rod is secured in the plunger 25 by a pin 28. This plunger has three pressure surfaces 25a, 25b and 25c. Each of these pressure surfaces is formed by reducing the diameter of the plunger. The pressure surface 25a acts in a chamber 29a, the pressure surface 25b acts in the chamber 29b, and the pressure surface 25c acts in the chamber 29c. It will be noted that the forces acting on the pressure surfaces 25a and 25b are opposite to the force acting upon the pressure surface 25c. The combined areas of the pressure surfaces 25a and 25b is equal to twice the area of the pressure surface 25c, that is, the three surfaces may be of equal area. Intermediate the pressure surfaces 25b and 25c the plunger 25 forms a valve and for this purpose it is reduced in diameter at 25d, thereby forming an annular chamber. A port 23a communicates with the chamber 29a, a port 23b communicates with the chamber 29b, a port 23c communicates with the chamber 29c and in addition there are provided ports 23d and 23e. The valve section of the plunger 25 controls communication between the port 23e and the ports 23d and 23c, the former being an exhaust port and the latter being a pressure port which is supplied with oil from a pump P and maintained at a constant pressure by a valve V.

The plunger 24 is quite similar to the plunger 25. It is connected to the beam 17 by a rod 30 one end of which is secured to the beam 17 by a pivot 31 and the other end of which is secured in the plunger by a pin 32. This plunger, like the plunger 25, has three pressure surfaces 24a, 24b and 24c each formed by reducing the diameter of the plunger. It will be noticed that the plunger 24 is in effect reversed with respect to the plunger 25 and the pressure surface 24c is equal to half the combined areas of the pressure surfaces 24a and 24b. The chambers of which these pressure surfaces form end walls communicate with ports 23a', 23b' and 23c' respectively. The ports 23a—23a', 23b—23b' and 23c—23c' are connected by passages so that the pressures on the complementary pressure surfaces 24a—25a, 24b—25b, 24c—25c will be the same, but due to the reversal of the pressure surfaces upon which these pressures will act, the resulting forces on the plungers 24 and 25 will be in opposite directions. It is also to be noted that the port 23e and the port 23b are connected. There is normally maintained on the surfaces 24a and 25a a pressure RP'' equal to one-half the pressure on the surfaces 24c and 25c, by means of the regulating valve Vc which pressure is indicated by the pressure gauge Pc.

Because the value M may be plus or minus, the result F' may also be plus or minus. To permit indications of these plus and minus values of F' by a positive pressure on the gauge Pb some arbitrary pressure may be taken as representing zero value of F', then pressures above that value represent positive values of F' and pressures lower than the arbitrary value represent negative values of F'. It will be seen that if M is set at its zero value there will be no moment due to the force F, therefore the value F' will be zero and the pressure Pb will assume its arbitrary value in order to balance the beam 17 at its normal position. With the pressure surfaces equal and the constant pressure applied to the surfaces 24c and 25c and one-half the constant pressure applied to the surfaces 24a and 25a it will be seen that one-half the constant pressure will be generated on the surfaces 24b and 25b to balance the system. Therefore the arbitrary pressure representing zero value of F' will be one-half the constant pressure.

From the construction of the computer shown in Figure 2, it will be seen that when a force is applied to the beam 17 through the plunger 21, it will cause the plunger 25 to increase the pressure in the oil in the chamber 29b, if the fulcrum-roller 18 is on the positive side of the beam as indicated. The force F is applied to the plunger 21 by the pressure of the oil in the chamber 22a. This pressure RP is controlled by the regulating valve Va and is indicated by the pressure gauge Pa.

If due to leakage or other causes an upward movement of the plunger 25 takes place, the port 23c and the port 23e will be put into communication, thus permitting oil under pressure to flow from the port 23c, through the ports 23e and 23b to the chamber 29b. The oil will thus flow until the volume of oil in the chamber 29b is sufficient to move the plunger 25 downwardly and close communication between the ports 23c and 23e at which time the beam 17 is returned to its normal position parallel to the surface 19. Likewise if the fulcrum-roller 18 is on the opposite side of the plunger 21 so that it requires an upward force on the plunger 25 to balance the moment of the force exerted by the plunger 21 the pressure generated in the chamber 29b will be reduced until the net force acting on the plungers 24 and 25 balance the force acting on the plunger 21. If due to leakage the plunger 25 moves downwardly so that the port 23e is placed into communication with the port 23d the oil will flow from the chamber 29b until the volume of oil in this chamber is reduced so that the beam 17 returns to its normal position. It is of course to be understood that the plunger 24 applies a force coincidentally with the plunger 25 and the forces acting on the pressure surfaces of the plunger 25 act on the corresponding pressure surfaces of the plunger 24 so that there are generated equal and opposite forces forming a couple which balances the moments of the force exerted through the plunger 21. When this balanced condition exists, the moment of the force acting on the plunger 21 represented by $F \cdot M$ is balanced by a couple represented by the force $F' \cdot L$. From this relation we have $F \cdot M = F' \cdot L$, and, therefore, $$F' = \frac{F \cdot M}{L}$$

in which L is constant and F' represents the pressure in the port 23b which is indicated on the pressure gauge Pb. The variation of this pressure from the arbitrary zero value is proportional to F' or the product $F \cdot M$.

The pressure surfaces 24a and 25a may be used for the purpose of adding to or subtracting from the result of the problem. If this is desired the regulating valve Vc is used to vary the pressure RP" applied to the pressure surfaces 24a and 25a, above or below the normal pressure of one-half the constant pressure of the system. It will be seen that the pressure indicated by the gauge Pb and generated by the surfaces 24b and 25b to balance the beam 17 will vary inversely with the pressure RP". If the force acting on the surfaces 24a and 25a due to the pressure RP" indicated by the gauge Pc is designated as F" and the force due to the constant pressure on the surfaces 24c and 25c is designated as Fk the equation for the balanced system will be $$F \cdot M + Fk \cdot L = F' \cdot L + F'' \cdot L$$

then $$F' \cdot L = F \cdot M + Fk \cdot L - F'' \cdot L$$

since L and Fk are constants $$F' = F \cdot M - F''$$

that is, an increase in pressure applied to the surfaces 24a and 25a will result in a corresponding subtraction from the product $F \cdot M$. Likewise it will be seen that a decrease in the pressure applied will result in an addition to the product. If this feature is not desired, the pressure surfaces 24a and 25a may be omitted, then the pressure surface 25b of the plunger 25 is made twice the area of the pressure surface 25c, and the pressure surface 24b of the plunger 24 is made twice the area of the pressure surface 24c. From the above description of Figure 2, it will be apparent that quantities may be multiplied by the use of this computer; for example, the weight and price of a quantity may be multiplied together to give the total price which may be modified to include a discount or tax.

It will be apparent that two or more computers of similar or different types may be used conjointly by applying the pressure representing the output of one computer as the input pressure of another computer. The output pressure of the final unit will represent the combined computation of all the units.

It is to be noted that both of these computers are capable of continuous performance. That is, they may solve problems in which the factors are continually changing, giving the results continuously.

It will be obvious that various changes may be made by those skilled in the art in the details of the embodiment illustrated in the drawings and described above within the principle and scope of the invention as expressed in the appended claims.

I claim:

1. A mechanism for effecting mathematical computations comprising two oppositely directed plungers operating upon a lever arm having a fixed length and constituting a couple, and means to produce a second couple in opposition to the first including an adjustable fulcrum for the lever arm and a hydraulic medium acted upon by one of the plungers and opposing the movement thereof in the direction induced by the moment of the first couple.

2. A computing mechanism comprising a lever arm, means for causing two forces to act upon the arm as a couple, two spaced reaction means opposing the moment of the couple and generating reaction forces constituting a balancing couple, and means to vary the distance between the forces of one of the couples.

3. A computing mechanism comprising a lever arm, means for causing two forces to act upon the arm as a couple, two spaced reaction means opposing the moment of the couple and generating reaction forces constituting a balancing couple, means to vary the distance between the forces of one of the couples, and means to measure the reaction force of the second couple.

4. A computing mechanism comprising a lever arm, means for causing two forces to act upon the arm as a couple, a confined hydraulic medium, reaction means including a fulcrum member and a pressure member for the hydraulic medium opposing the moment of the couple and generating reaction forces constituting a balancing couple, and means to measure the pressure of the hydraulic medium.

5. A computing mechanism comprising a lever arm, means for causing two forces to act upon the arm as a couple, a confined hydraulic medium, reaction means including a fulcrum member and a pressure member for the hydraulic medium opposing the moment of the couple and generating reaction forces constituting a balancing couple, means to adjust the distance between the forces of one of the couples, and means to measure the pressure of the hydraulic medium.

6. A computing mechanism comprising a lever arm, means for causing two forces to act upon the arm as a couple, a confined hydraulic medium, reaction means including an adjustable fulcrum and a pressure member for the hydraulic medium opposing the moment of the couple and generating reaction forces constituting a balancing couple, and means to measure the pressure of the hydraulic medium.

7. A computing mechanism comprising a lever arm, an adjustable fulcrum for the arm, means to apply a predetermined force to the arm coactive with the fulcrum as a couple to produce a moment, two spaced reaction means opposing the moment of the couple and generating reaction forces constituting a balancing couple, means to measure the reaction force of the second couple, and means for applying two equal predetermined forces to the arm at a fixed distance apart as a couple to modify the moment of the first couple.

8. A computing mechanism comprising a lever arm, two force applying means attached to the arm at a fixed distance apart, means for producing an equal and opposite force in the two means and thereby cause them to act as a couple upon the arm, two spaced reaction means opposing the moment of the couple and generating reaction forces constituting a balancing couple, and means to adjust the distance between the forces of the balancing couple.

WILLIAM H. NEWELL.